Patented Mar. 27, 1923.

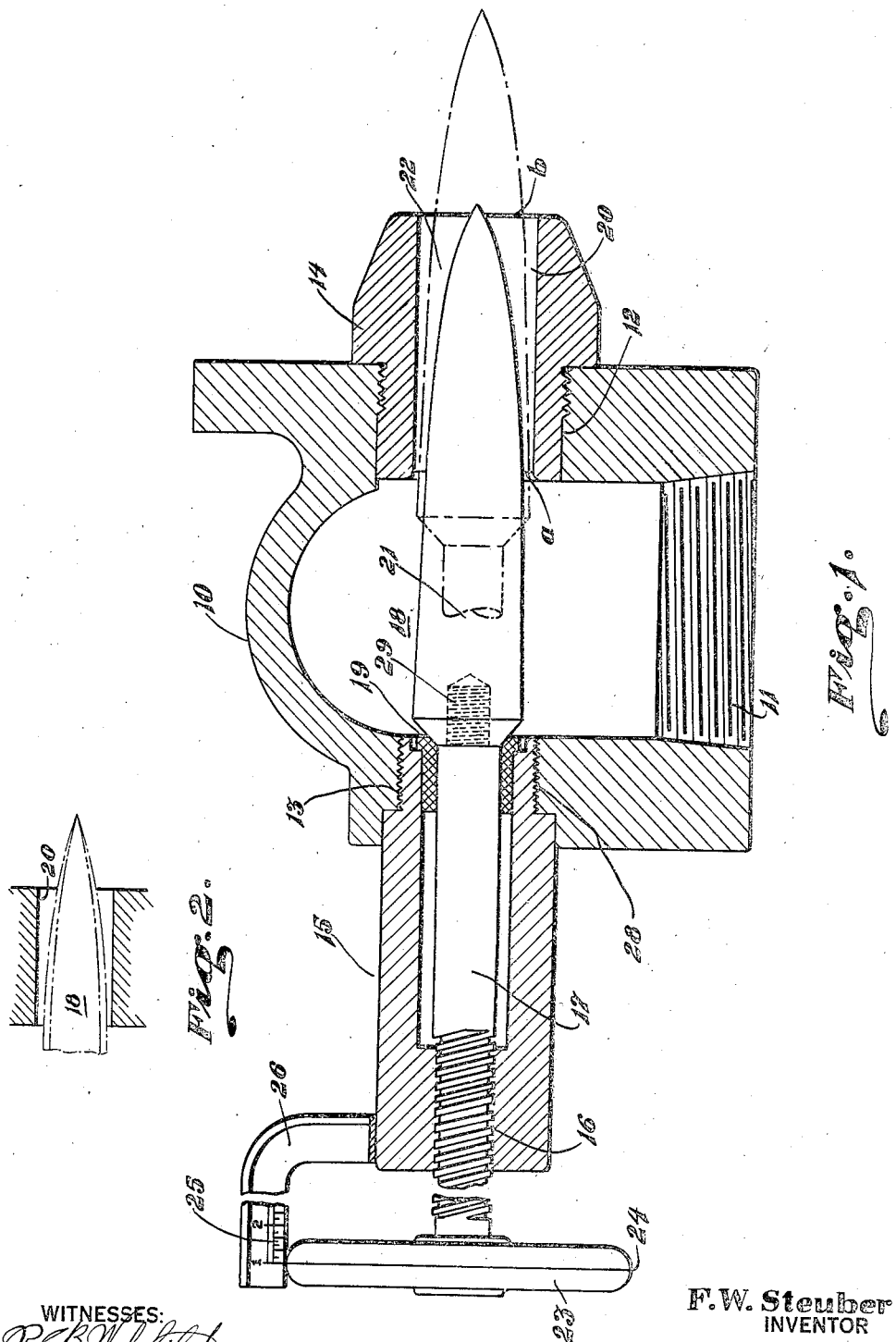

1,449,873

UNITED STATES PATENT OFFICE.

FREDERICK W. STEUBER, OF CHESTER, PENNSYLVANIA.

NOZZLE.

Application filed January 20, 1922. Serial No. 530,644.

*To all whom it may concern:*

Be it known that I, FREDERICK W. STEU-BER, a citizen of the United States, and a resident of Chester, in the county of Delaware and State of Pennsylvania, have invented a new and useful Improvement in Nozzles, of which the following is a specification.

My invention relates to expansion nozzles for elastic fluid and it has for its object to provide apparatus of the character designated which shall be adjustable to vary the rate of flow of elastic fluid with the maintenance of high nozzle efficiency for all positions of adjustment.

My improved nozzle mechanism employs relatively adjustable nozzle members which are so designed as to maintain a constant ratio of expansion for all positions of adjustment, or which may be so designed as to give a ratio of expansion which shall vary as a function of the rate of flow to take care of changes in the initial and final fluid-pressure conditions.

Apparatus embodying features of my invention is illustrated on the accompanying drawing, forming a part of this application, in which: Fig. 1 is a longitudinal sectional view of my improved nozzle mechanism; and Fig. 2 is a diagrammatic detail view of a portion of the apparatus shown in Fig. 1.

Nozzles have been made adjustable by throttling, but this method is objectionable for two reasons, namely, first, the heat or energy loss due to the pressure drop incidental to throttling, and second, the disturbance of the relation of inlet and exit pressures for which the nozzle passage is designed. My improved nozzle is adjustable without disturbing the relation of inlet and exit pressures, without involving throttling losses, and with the maintenance of a desirable expansion ratio or ratios for all positions of adjustment.

My improved nozzle mechanism may be employed wherever its peculiar characteristics are desirable. For example, it may be used in connection with turbines which now commonly employ either the method of throttling or the method of cutting in or out of nozzles in order to vary the rate of flow of motive fluid; and, if applied to a turbine, it is obvious that the rate of flow of motive fluid thereto may be controlled without involving the losses pointed out and at the same time making it possible to design a turbine with a less number of nozzles than necessary in those cases where the nozzles are cut in and out in order to vary the power. Also, my invention may be used in connection with ejectors of various kinds. In other words, my invention is useful in any relation requiring the use of expanded and high-velocity motive fluid in variable quantities. While, in most instances, a constant ratio of expansion is desirable and my invention is primarily directed to apparatus including this characteristic as a feature, yet, it is to be understood that conditions may be met with in practice which shall require a variable ratio of expansion. My invention, therefore, contemplates, in its broadest aspect, a nozzle mechanism which employs relatively adjustable nozzle members to secure a variation in the rate of flow of motive fluid with the maintenance of a constant ratio of expansion or wherein the expansion ratio varies as a function of the rate of flow of motive fluid, the desirable condition of expansion depending upon the conditions met with in practice.

Referring now to the drawing for a more detailed description of my invention, I show an elastic-fluid supply or nozzle chamber 10, having an elastic-fluid connection 11 adapted to cooperate with any suitable elastic-fluid conduit. The supply chamber has opposed openings 12 and 13 to receive, respectively, an exterior nozzle member 14 and a hollow stem or supporting means 15, having a threaded connection 16 with a traversing means or stem 17 of an interior nozzle member 18. A suitable steam-tight bushing 19 is preferably carried by the interior of the hollow stem or supporting means 15 to maintain the interior nozzle member in co-axial relationship with respect to the exterior nozzle member 14.

The exterior nozzle member 14 is shown as being provided with an interior nozzle opening 20 and the interior approximately paraboloidal nozzle member 18 is provided with a suitably tapered and longitudinally curved surface 21 which, at all times, extends entirely through the opening 20 to define, with the latter, an expanding nozzle passage 22, having inlet and exit annular areas $a$ and $b$ which have a constant expansion ratio for all positions of adjustment of the interior nozzle member 18, the annular area $a$ being the throat area of the nozzle passage and the annular area $b$ being the exit or discharge area of the discharge nozzle passage. In the drawing, I show, in full lines, the interior nozzle member 18 in an extreme open position, and, in dotted lines, in an extreme restricted position. The same ratio of annular areas $a$ and $b$ is preserved for the extreme positions as well as for all intermediate positions of the interior nozzle member 18.

In Fig. 1, the ratio of the exit area $b$ to the throat area $a$ is approximately as $2\frac{1}{2}$ is to 1. The inner member 18 may be changed for one of a different size or shape as indicated in Fig. 2, in order to meet varying conditions and requirements in practice. For example, if an expansion ratio of approximately 2 to 1 is suitable for expanding steam from 100 pounds pressure to a given lower pressure, then in order to expand steam from 150 pounds to approximately the same lower pressure, an inner nozzle member having an expansion ratio of approximately 3 to 1 would be used. In other words, for the same outer nozzle member 14, the nozzle is flexible to meet varying conditions or requirements such as varying inlet pressures and rates of flow, it being understood, however, that for any interior nozzle member a constant ratio of expansion is preserved with respect to the outer nozzle member for all positions of relative adjustments.

In order that the paraboloidal inner member may be readily changed, I show the hollow stem provided with a suitable connection 28 with respect to the chamber member 10 so that the hollow stem 15 and the interior nozzle member 18 with its supporting stem 17 may be removed together. A threaded connection 29 is preferably provided between the stem 17 and the interior nozzle member 18 so that the latter may be readily removed to receive another in case it is desired to change interior nozzle members.

As the exterior nozzle member opening is preferably cylindrical, but for a rounded portion at the inlet end, said member may be easily manufactured; and, in case a larger opening is desired, a nozzle member of this character may be readily reamed out to the desired size. The ease of manufacture is a decided point of advantage with my construction as it is unnecessary to carry in stock a large number of special tools, which is commonly done by nozzle manufacturers. It will be apparent that the cylindrical opening in the exterior nozzle member need not be bored or reamed out to a precise degree for the reason that the size of the corresponding nozzle passage 22 may be easily adjusted by moving the interior nozzle member 18. For all sizes of nozzle openings in exterior nozzle members and for all adjustments of a given interior nozzle member with respect to the exterior members, the same ratio of inlet or throat and exit areas, or ratio of expansion, is preserved.

The stem 17 of the interior nozzle member is preferably operated by means of a suitable hand-wheel 23 which is shown as being provided with an indicating line 24 cooperating with suitable indicia 25 on a member 26 carried by the hollow stem 15 of the chamber member 10.

It will be obvious that the cross-sectional shape of the nozzle opening 20 as well as that of the interior nozzle member may be varied as desired. For example, the shape may be rectangular, or any other suitable shape.

From the structure described, the operation of apparatus made in accordance with my invention will be obvious; steam or elastic fluid is admitted to the chamber 10 and it passes through the nozzle expanding passage 22, defined between the exterior nozzle members 14 and 18, respectively, wherein the pressure or potential energy of the elastic fluid is converted into velocity or kinetic energy, the extent of conversion depending upon the drop in pressure and the latter in turn depending upon the volumetric change, which, in turn, depends upon the ratio of throat or inlet and exit areas, or ratio of expansion. If it is desired to vary the rate of flow of elastic fluid or steam through my improved nozzle, the interior and exterior members are relatively adjusted. If it should be desirable to substitute an interior nozzle member 18 to meet different conditions in practice or on account of wear, this may be readily done by removing the hollow stem 15 after which the interior nozzle member 18 may be removed and another substituted. Also, the exterior nozzle member 14 is capable of ready removal so that it may be replaced by another whenever necessary. The position of the interior nozzle member 18 with respect to the exterior nozzle member 14, and, therefore, the capacity or rate of flow for an expanding nozzle passage, may be gauged by observing the position of the pointer line 23 with respect to the indicia 24 carried by the arm 25.

From the foregoing, it will be apparent that I have devised a nozzle which is capable of expanding any suitable elastic fluid at variable rates of flow without throttling losses and without a disturbance in the ratio of pressures at the inlet and exit ends of the nozzle passage and one which has a variable rate of flow with a uniform expansion ratio. My improved nozzle may be used in any situation in which the characteristics referred to may be desirable, as, for example, in connection with turbines, ejectors, and the like.

While I have hereinbefore particularly described a nozzle mechanism in which a constant ratio of expansion is preserved, yet it is to be understood that my invention, in its broadest aspect, is not limited in this way, but it also covers the situation in which the expansion ratio is caused to vary as a function of the adjustment or of the rate of flow of motive fluid. This is advantageous where it is desirable to have the expansion ratio vary due to a change in the initial and final pressure conditions of the motive fluid. My particular type of nozzle mechanism is, therefore, capable of various adjustments—the exterior and interior nozzle members are movable to vary the rate of flow, and they are replaceable to increase or decrease the range of rates of flow, or to modify the ratio of expansion to suit the particular conditions encountered in practice. In order that a predetermined ratio or ratios of expansion may be preserved, it is necessary that the interior nozzle member shall extend entirely through the exterior member for all positions of adjustment.

While I have shown my invention in but one form, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a nozzle, the combination of relatively adjustable exterior and interior nozzle members together defining an expanding nozzle passage having a substantially constant ratio of expansion for all positions of adjustment thereof.

2. In a nozzle, the combination of relatively adjustable and co-axially arranged exterior and interior nozzle members, having the interior member extending entirely through the exterior member for all positions of relative adjustment and the opposed surfaces of said members being so shaped that a constant ratio of expansion is preserved for all positions of adjustment thereof.

3. In a nozzle, the combination of an exterior nozzle member having a nozzle opening of uniform cross-sectional area except for a rounded portion at the inlet end and an interior nozzle member extending through the nozzle opening, said interior nozzle member having a paraboloidal-like taper and defining, with said nozzle opening, an expanding nozzle passage.

4. In a nozzle, the combination of an exterior nozzle member having a nozzle opening of uniform cross-sectional area except for a rounded portion at the inlet end and an interior nozzle member adjustable relatively to the exterior nozzle member and extending entirely through the nozzle opening of the latter for all positions of adjustment, said interior nozzle member having a paraboloidal-like taper so as to define an expanding nozzle passage of constant expansion ratio for all positions of adjustment of the interior nozzle member with respect to the exterior nozzle member.

5. In a nozzle, the combination of an exterior nozzle member having a cylindrical nozzle opening except for a short rounded portion at the inlet end, and an interior nozzle member extending entirely through the nozzle opening, said interior nozzle member being circular in cross-section and tapered and curved longitudinally, the exterior and interior nozzle members defining an annular expanding nozzle passage with a constant ratio of expansion for all positions of adjustment of the interior member with respect to the exterior member.

6. A nozzle mechanism adapted to convert pressure or potential energy of elastic fluid into kinetic or velocity energy comprising a nozzle chamber adapted to receive elastic fluid and being provided with oppositely alined openings, an exterior nozzle member adapted to fit in one of the openings and having a cylindrical nozzle opening, an interior nozzle member co-axially arranged with respect to the nozzle opening of the exterior nozzle member, means extending through the other opening for supporting the interior nozzle member and for adjusting the latter with respect to the exterior nozzle member, the interior nozzle member being circular in cross-section and being tapered and curved longitudinally so as to define with the cylindrical opening of the exterior nozzle member, an expanding nozzle passage having a constant ratio of expansion for all positions of adjustment of the interior nozzle member with respect to the exterior nozzle member.

7. A nozzle mechanism comprising a nozzle chamber having opposed openings and adapted to receive expansible fluid and removable exterior and interior nozzle members fitted in said openings, said nozzle members being relatively adjustable to vary the rate of flow of expansible fluid and being so shaped as to define a nozzle passage having an approximately constant ratio of expansion for all positions of adjustment.

8. A nozzle mechanism comprising a nozzle chamber having opposed openings and adapted to receive expansible fluid, a removable outer nozzle member fitted in one of the openings, an inner nozzle member relatively adjustable with respect to the outer nozzle member and extending entirely through the latter for all positions of adjustment to define a nozzle passage of variable size but of constant expansion ratio, supporting means for the inner nozzle member removably fitted in the other opening, and traversing means for the inner nozzle member carried by the supporting means and detachably connected to the inner nozzle member, whereby different inner nozzle members may be secured to the traversing means when the supporting means is removed to meet different service conditions.

9. In a nozzle mechanism, the combination of co-axially-arranged exterior and interior nozzle members which are relatively adjustable in order to vary the rate of flow of motive fluid, the interior member extending entirely through the exterior member for all positions of relative adjustment and the opposed surfaces of said members being so shaped as to maintain predetermined expansion conditions.

10. In a nozzle mechanism, the combination of co-axially-arranged exterior and interior nozzle members, the interior nozzle member being adjustable with respect to the exterior nozzle member in order to vary the rate of flow of motive fluid, the interior nozzle member extending entirely through the exterior nozzle member for all positions of adjustment and being so shaped as to secure a predetermined condition of expansion for all positions of adjustment.

11. In a nozzle mechanism, the combination of an exterior nozzle member having a nozzle opening of uniform cross-sectional area, an interior nozzle member of similar cross-sectional area, adjustable with respect to the exterior nozzle member and extending entirely through the latter for all positions of adjustment and being so designed as to define therewith an expansion passage having predetermined expansion conditions, and means associated with the interior nozzle member, whereby the latter may be adjusted with respect to the exterior nozzle member to vary the size of the expansion passage to secure a variation in the rate of flow of motive fluid.

In testimony whereof, I have hereunto subscribed my name this sixth day of January, 1922.

FREDERICK W. STEUBER.